United States Patent
He et al.

(10) Patent No.: US 9,517,788 B2
(45) Date of Patent: Dec. 13, 2016

(54) BABY CARRIAGE

(71) Applicant: Goodbaby Child Products Co., Ltd, Kunshan, Jiangsu (CN)

(72) Inventors: Xinjun He, Jiangsu (CN); Fusheng Ma, Jiangsu (CN)

(73) Assignee: Goodbaby Child Products Co., Ltd., Jiangsu (CN)

( * ) Notice: Subject to any disclaimer, the term of this patent is extended or adjusted under 35 U.S.C. 154(b) by 0 days.

(21) Appl. No.: 14/440,560

(22) PCT Filed: Dec. 26, 2013

(86) PCT No.: PCT/CN2013/090503
§ 371 (c)(1),
(2) Date: May 4, 2015

(87) PCT Pub. No.: WO2015/032163
PCT Pub. Date: Mar. 12, 2015

(65) Prior Publication Data
US 2016/0185376 A1 Jun. 30, 2016

(30) Foreign Application Priority Data
Sep. 5, 2013 (CN) .......................... 2013 1 0398407

(51) Int. Cl.
*B62B 7/00* (2006.01)
*B62B 7/08* (2006.01)
*B62B 7/06* (2006.01)

(52) U.S. Cl.
CPC ................. *B62B 7/08* (2013.01); *B62B 7/086* (2013.01); *B62B 7/062* (2013.01); *B62B 7/064* (2013.01); *B62B 2205/02* (2013.01)

(58) Field of Classification Search
CPC .............. B62B 7/00; B62B 7/08; B62B 7/086; B62B 7/04; B62B 7/06; B62B 7/064; B62B 7/066; B62B 7/10
See application file for complete search history.

(56) References Cited

U.S. PATENT DOCUMENTS 4,272,100 A * 6/1981 Kassai ...................... B62B 7/08
280/47.4
RE31,760 E * 12/1984 Kassai ...................... B62B 7/08
280/42

(Continued)

FOREIGN PATENT DOCUMENTS

CN 101607569 12/2009
CN 101722977 6/2010

(Continued)

*Primary Examiner* — James M Dolak
(74) *Attorney, Agent, or Firm* — Connie Ding; Peter L. Brewer; Baker Donelson IP Group (57) ABSTRACT

A baby carriage is provided in the invention, the frame of the baby carriage comprises a left support frame and a right support frame symmetrical to each other, and a connecting frame connected between the left and right support frames. The left support frame comprises a left front frame, a left rear frame, a left rod, a left connecting rod with a front portion being rotatably connected with the left front frame, a left pull rod rotatably connected with the left rear frame and a left push rod frame rotatably connected with the upper portion of the left rod. The left pull rod is rotatably connected with the rear portion of the left connecting rod and the lower portion of the left push rod frame is rotatably connected with the upper portion of the left pull rod.

14 Claims, 11 Drawing Sheets

(56) References Cited

U.S. PATENT DOCUMENTS

| | | | | |
|---|---|---|---|---|
| 4,762,335 | A * | 8/1988 | Kassai | B62B 7/08 280/649 |
| 4,765,645 | A * | 8/1988 | Shamie | B62B 7/08 280/42 |
| 5,197,753 | A | 3/1993 | Liu | |
| 5,553,885 | A | 9/1996 | Chang | |
| 5,752,738 | A * | 5/1998 | Onishi | B62B 7/08 280/642 |
| 5,810,382 | A * | 9/1998 | Onishi | B62B 9/20 280/648 |
| 6,964,429 | B2 * | 11/2005 | Suga | B62B 7/08 280/47.38 |
| 8,066,300 | B2 * | 11/2011 | Ohnishi | B62B 7/08 280/47.25 |
| 8,210,562 | B2 * | 7/2012 | Ohnishi | B62B 7/08 280/642 |
| 8,444,170 | B2 * | 5/2013 | Chen | B62B 7/08 280/642 |
| 8,602,442 | B2 * | 12/2013 | Li | B62B 7/062 280/642 |
| 8,899,614 | B2 * | 12/2014 | Smith | B62B 7/08 280/657 |
| 9,027,953 | B2 * | 5/2015 | Funakura | B62B 7/08 280/650 |

FOREIGN PATENT DOCUMENTS

| | | |
|---|---|---|
| CN | 201856793 | 6/2011 |
| CN | 203528559 | 4/2014 |

* cited by examiner

BABY CARRIAGE

CROSS REFERENCE TO RELATED APPLICATIONS

This application is a §371 National State Application of PCT/CN2013/090503 filed Dec. 26, 2013 which claims priority to CN 201310398407.X filed Sep. 5, 2013, which are incorporate by reference in their entirety.

FIELD OF THE INVENTION

The present invention relates to a baby carriage.

DESCRIPTION OF THE RELATED ART

Generally, a baby carriage in the prior art comprises a frame having an unfolded position and a folded position, a front wheel assembly and a rear wheel assembly disposed at the bottom of a lower portion of the frame, a support device disposed on the frame for supporting a human body, and a locking mechanism for locking the frame when it is in the unfolded position. Currently, there exist a wide variety of frames, the number of rods of the frame, the connection relations and connection locations of rods are different from each other, thus various folding principle and folding means are utilized in the existing baby carriages.

SUMMARY OF THE INVENTION

The technical problem to be solved by the invention is to provide a baby carriage.

In order to solve the above problem, the following technical solution is utilized in the invention.

A baby carriage comprises a frame having an unfolded position and a folded position, a left front wheel assembly, a right front wheel assembly, a left rear wheel assembly, a right rear wheel assembly, a frame locking mechanism for locking the frame when it is in the unfolded position, and a seat disposed on the frame. The frame comprises a left support frame at the left side thereof, a right support frame at the right side thereof and a connecting frame connected between the left support frame and the right support frame.

The left support frame comprises:
a left front frame, on a lower portion of which the left front wheel assembly is arranged on;
a left rear frame, on a lower portion of which the left rear wheel assembly is arranged;
a left rod, two of the upper portion of the left front frame, the upper portion of the left rear frame and the lower portion of the left rod being rotatably connected with each other, and the other one being rotatably connected with at least one of the two;
a left connecting rod, the front portion of which is rotatably connected with the left front frame by a left third shaft;
a left pull rod, which is rotatably connected with the left rear frame by a left fourth shaft, and which is rotatably connected with a rear portion of the left connecting rod by a left fifth shaft; and
a left push rod frame, which is rotatably connected with an upper portion of the left rod by a left sixth shaft, and a lower portion of which is rotatably connected with the upper portion of the left pull rod by a left seventh shaft.

The right support frame comprises:
a right front frame, on a lower portion of which the right front wheel assembly is arranged;
a right rear frame, on a lower portion of which the right rear wheel assembly is arranged;
a right rod, two of the upper portion of the right front frame, the upper portion of the right rear frame and the lower portion of the right rod being rotatably connected with each other, and the other one being rotatably connected with at least one of the two;
a right connecting rod, a front portion of which is rotatably connected with the right front frame by a right third shaft;
a right pull rod, which is rotatably connected with the right rear frame by a right fourth shaft, and which is rotatably connected with a rear portion of the right connecting rod by a right fifth shaft; and
a right push rod frame, which is rotatably connected with an upper portion of the right rod by a right sixth shaft, and a lower portion of which is rotatably connected with the upper portion of the right pull rod by a right seventh shaft.

The connecting frame comprises:
a front transverse rod, one end of which is rotatably connected with the left front frame by a left ninth shaft, and the other end of which is rotatably connected with the right front frame by a right ninth shaft;
a rear transverse rod, one end of which is rotatably connected with the left rear frame by a left tenth shaft, and the other end of which is rotatably connected with the right rear frame by a right tenth shaft; and
an upper transverse rod, one end of which is rotatably connected with the left push rod frame by a left eleventh shaft, and the other end of which is rotatably connected with the right push rod frame by a right eleventh shaft.

when the frame is in the unfolded position, an angle α in the range of 165°-195° is formed between the left front frame and the left rod, and correspondingly an angle α' in the range of 165°~195° is formed between the right front frame and the right rod. In some embodiments, when the frame is in the folded position, the shaft axis of the left ninth shaft and the shaft axis of the left tenth shaft are parallel to the shaft axis of the left eleventh shaft, and the shaft axis of the right ninth shaft and the shaft axis of the right tenth shaft are parallel to the shaft axis of the right eleventh shaft. Or alternatively, the shaft axis of the left ninth shaft, and the shaft axis of the left tenth shaft coincide with the shaft axis of the left eleventh shaft, and the shaft axis of the right ninth shaft and the shaft axis of the right tenth shaft coincide with the shaft axis of the right eleventh shaft.

In some embodiments, a first front limiting mechanism and second front limiting mechanism respectively are arranged on the two ends of the front transverse rod and/or the left front frame and the right front frame.

In another specific embodiment, a first rear limiting mechanism and a second rear limiting mechanism respectively are arranged on the two ends of the rear transverse rod and/or the left rear frame and the right rear frame.

In another specific embodiment, a first upper limiting mechanism and a second upper limiting mechanism respectively are arranged on the two ends of the upper transverse rod and/or the left push rod frame and the right push rod frame.

In some embodiments, the connecting frame also comprises a connecting transverse rod, one end of the connecting transverse rod is rotatably connected with the left connecting rod by a left twelfth shaft, and the other end of the connecting transverse rod is rotatably connected with the right connecting rod by a right twelfth shaft. The shaft axis of the left ninth shaft, the shaft axis of the left tenth shaft and the shaft axis of the left eleventh shaft are parallel to or coincide with the shaft axis of the left twelfth shaft. Correspondingly, the shaft axis of the right ninth shaft, the shaft axis of the right tenth shaft and the shaft axis of the right eleventh shaft are parallel to or coincide with the shaft axis of the right twelfth shaft.

In some further embodiments, the two ends of the connecting transverse rod and/or the left connecting rod and the right connecting rod respectively are provided with a connecting rod limiting mechanism.

In some embodiments, the left front wheel assembly comprises a left front wheel. The left rear wheel assembly comprises a left rear wheel joint rotatably connected with the lower portion of the left rear frame by a left eighth shaft, and a left rear wheel rotatably arranged on the left rear wheel joint. A left positioning mechanism is arranged on the left rear wheel joint and/or the left rear frame. The right front wheel assembly comprises a right front wheel. The right rear wheel assembly comprises a right rear wheel joint rotatably connected with the lower portion of the right rear frame by a right eighth shaft, and a right rear wheel rotatably arranged on the right rear wheel joint. A right positioning mechanism is arranged on the right rear wheel joint and/or the right rear frame. When the frame is in the folded position, the wheel shaft of the left rear wheel is located between the left front frame and the left rear frame, and the left rear wheel is located above the left front wheel, the wheel shaft of the right rear wheel is located between the right front frame and the right rear frame, and the right rear wheel is located above the right front wheel.

In some embodiments, the left push rod frame comprises a left push rod located at a lower portion thereof and rotatably connected with the left rod and the left pull rod, and a left push handle slidably disposed on the left push rod along the length direction of the left push rod, a left push rod positioning mechanism is arranged on the left push rod and/or the left push handle. The right push rod frame comprises a right push rod located at a lower portion thereof and rotatably connected with the right rod and the right pull rod, and a right push handle slidably disposed on the right push rod along the length direction of the right push rod, a right push rod positioning mechanism is arranged on the right push rod and/or the right push handle. The upper transverse rod is rotatably connected between the left push handle and the right push handle.

In some embodiments, the upper portion of the left front frame is rotatably connected with the upper portion of the left rear frame by a left first shaft, the lower portion of the left rod is rotatably connected with the upper portion of the left rear frame by a left second shaft, and the left first shaft is located below and in front of the left second shaft. The upper portion of the right front frame is rotatably connected with the upper portion of the right rear frame by a right first shaft, the lower portion of the right rod is rotatably connected with the upper portion of the right rear frame by a right second shaft, and the right first shaft is located below and in front of the right second shaft.

In some embodiments, when the frame is in the folded position, the length of the baby carriage is within the range of 250-290 mm, the width of the baby carriage is within the range of 120-150 mm and the height of the baby carriage is within the range of 340-500 mm.

In some embodiments, the left fifth shaft is located in front of the left fourth shaft, and the right fifth shaft is located in front of the right fourth shaft.

In some embodiments, the left seventh shaft is located below the left sixth shaft, and the right seventh shaft is located below the right sixth shaft.

In some embodiments, the angle $\alpha$ is in the range of 170°-185°, and correspondingly the angle $\alpha'$ is in the range of 170°-185°.

The above terms related to orientation, such as, "upper", "lower", "front", and "rear", are defined when the frame is in the unfolded position, wherein the position of the left/right front wheel assembly represents the direction of "front", and the position of the left/right rear wheel assembly represents the direction of "rear".

The scope of the invention is not limited to the technical schemes combined particularly by the abovementioned technical features, other technical schemes combined discretionarily by the above-mentioned technical features or equivalent features should also be covered in the present invention, such as the technical schemes formed by exchanging the aforementioned features with the technical features having the similar functions, including but no limited to, disclosed in the invention.

Due to the application of the above technical solution, as compared with the prior art, the invention has the following advantages: the left and the right support frames are provided symmetrically, and respectively are configured as a folding link mechanism. When the frame locking mechanism is unlocked, the left and right support frames respectively can be folded into a first folding state, such that the size of the frame in front-rear direction and up-down direction becomes smaller. Then, the left and right support frames respectively are rotated relative to the connecting frame to draw close to each other and into a second folding state, such that the size of the frame in left-right direction also becomes smaller, that is to say, the frame is in the folded position. The baby carriage of the invention has smaller volume after frame folding, and thus is convenient for carrying.

wherein 1. frame; 2. a left support frame; 3. a right support frame; 4. a connecting frame; 21. a left front frame; 22. a left rear frame; 23. a left rod; 24. a left connecting rod; 25. a left pull rod; 26. a left push rod frame; 261. a left push rod; 262. a left push handle; 211. a left first shaft; 212. a left second shaft; 213. a left third shaft; 214. a left fourth shaft; 215. a left fifth shaft; 216. a left sixth shaft; 217. a left seventh shaft; 218. a left eighth shaft; 31. a right front frame; 32. a right rear frame; 33. a right rod; 34. a right connecting rod; 35. a right pull rod; 36. a right push rod frame; 361. a right push rod; 362. a right push handle; 311. a right first shaft; 312. a right second shaft; 313. a right third shaft; 314. a right fourth shaft; 315. a right fifth shaft; 316. a right sixth shaft; 317. a right seventh shaft; 318. a right eighth shaft; 41. a front transverse rod; 42. a rear transverse rod; 43. an upper transverse rod; 44. a connecting transverse rod; 411. a left ninth shaft; 412. a left tenth shaft; 413. a left eleventh shaft; 414. a left twelfth shaft; 421. a right ninth shaft; 422. a right tenth shaft; 423. a right eleventh shaft; 424. a right twelfth shaft; 5. a left front wheel assembly; 6. a left rear wheel assembly; 7. a right front wheel assembly; 8. a right rear wheel assembly; 61. a left rear wheel joint; 62. a left rear wheel; 81. a right rear wheel joint; 82. a right rear wheel.

DESCRIPTION OF THE PREFERRED EMBODIMENTS

The present invention will be described hereinafter with reference to the accompanying drawings. It is to be noted, however, that the drawings are given only for illustrative purpose and therefore not to be considered as limiting of its scope, for the invention may admit to other equally effective embodiments.

Embodiment 1

Figure 1:
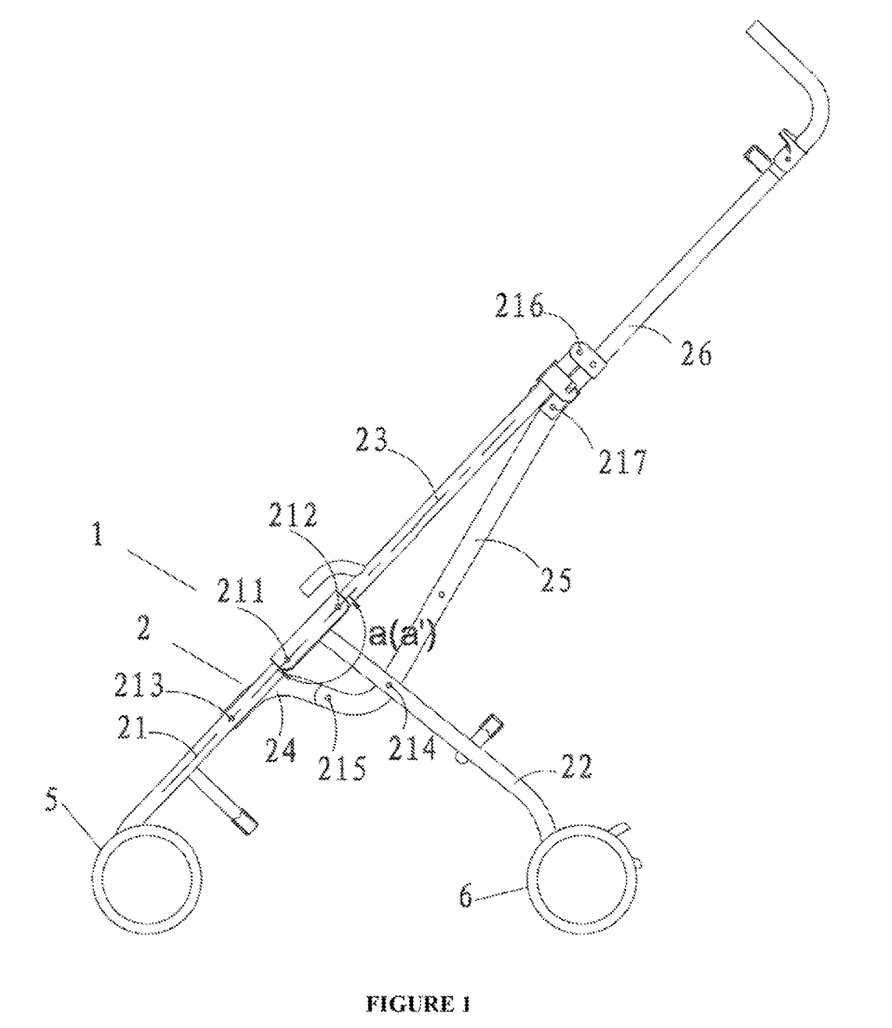
FIG. 1 is a side view of the frame in the unfolded position according to the invention (embodiment 1)
Figure 2:
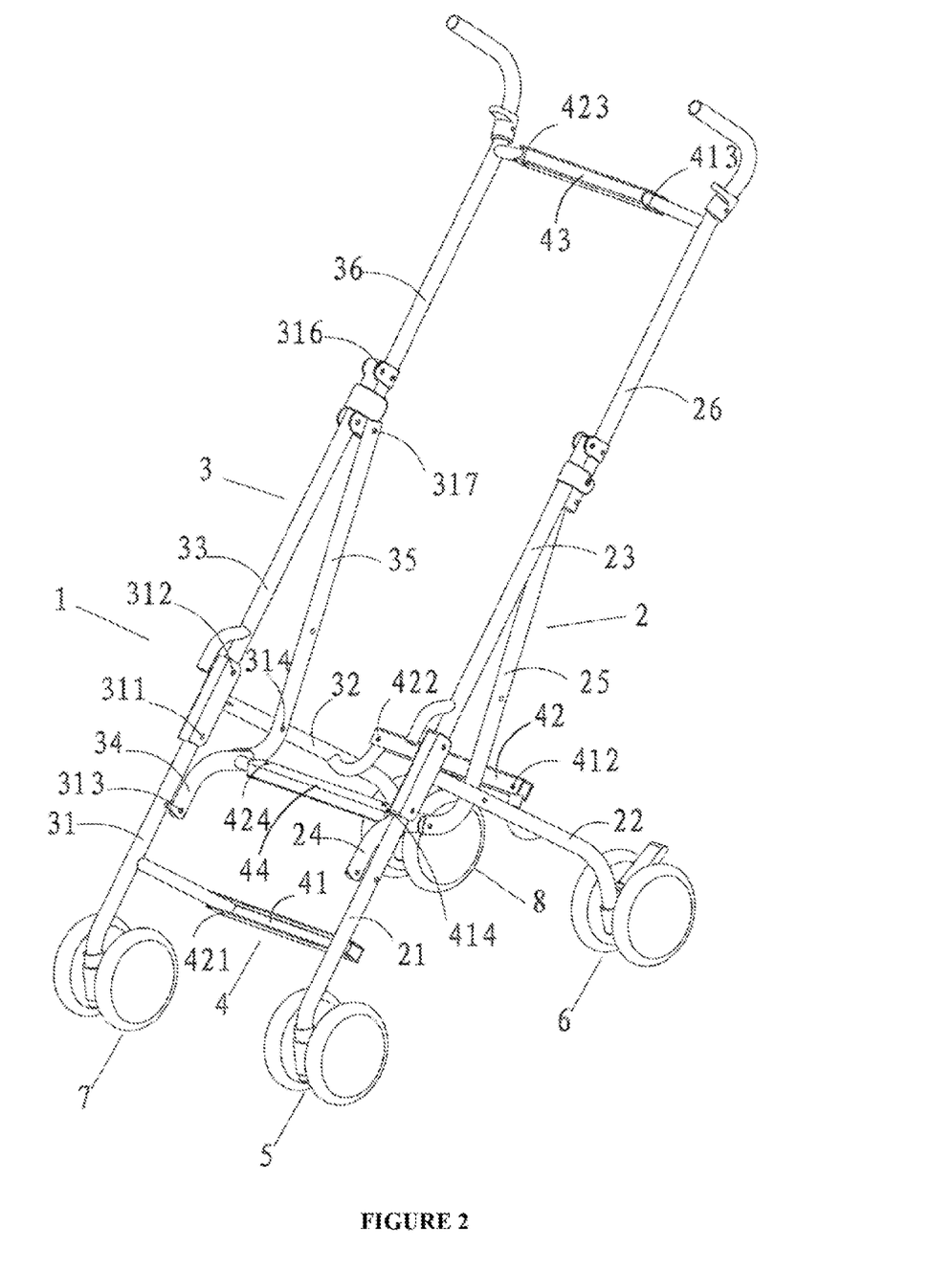
FIG. 2 is a perspective view of the frame in the unfolded position according to the invention (embodiment 1)
Figure 3:
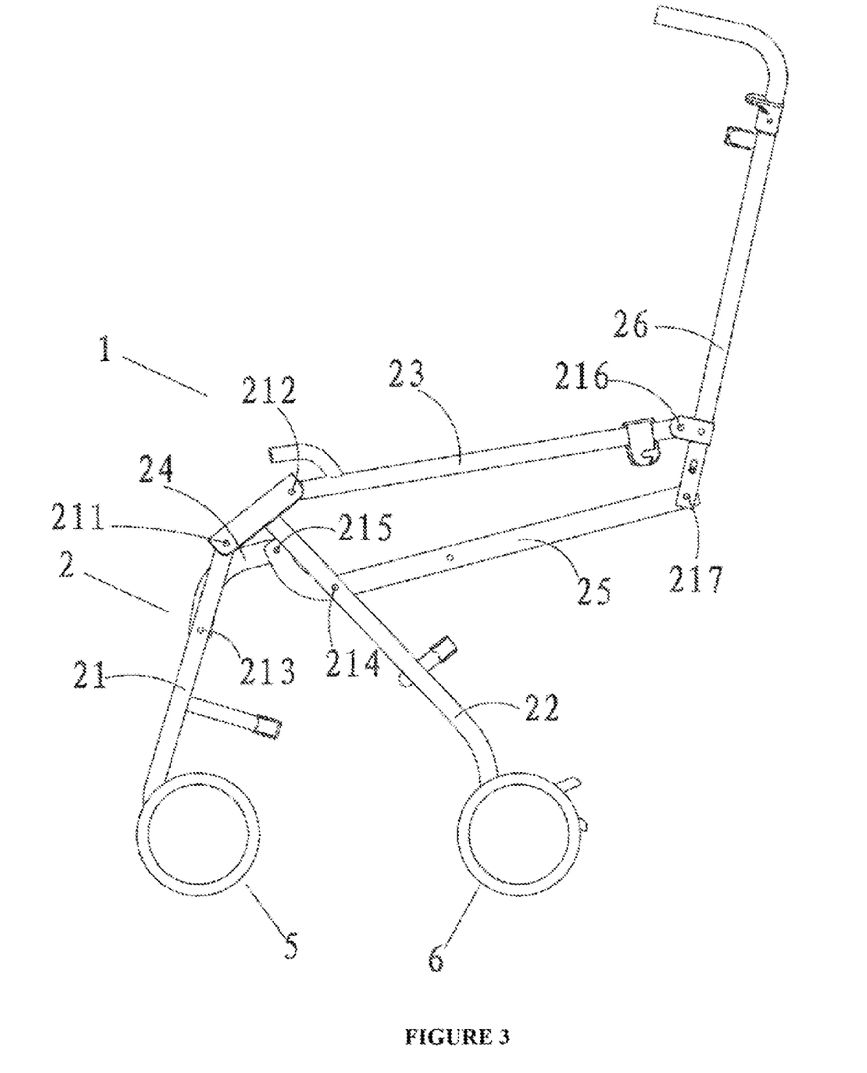
FIG. 3 is a side view of the frame in the course of conversion between the unfolded position and the folded position according to the invention (embodiment 1)
Figure 4:
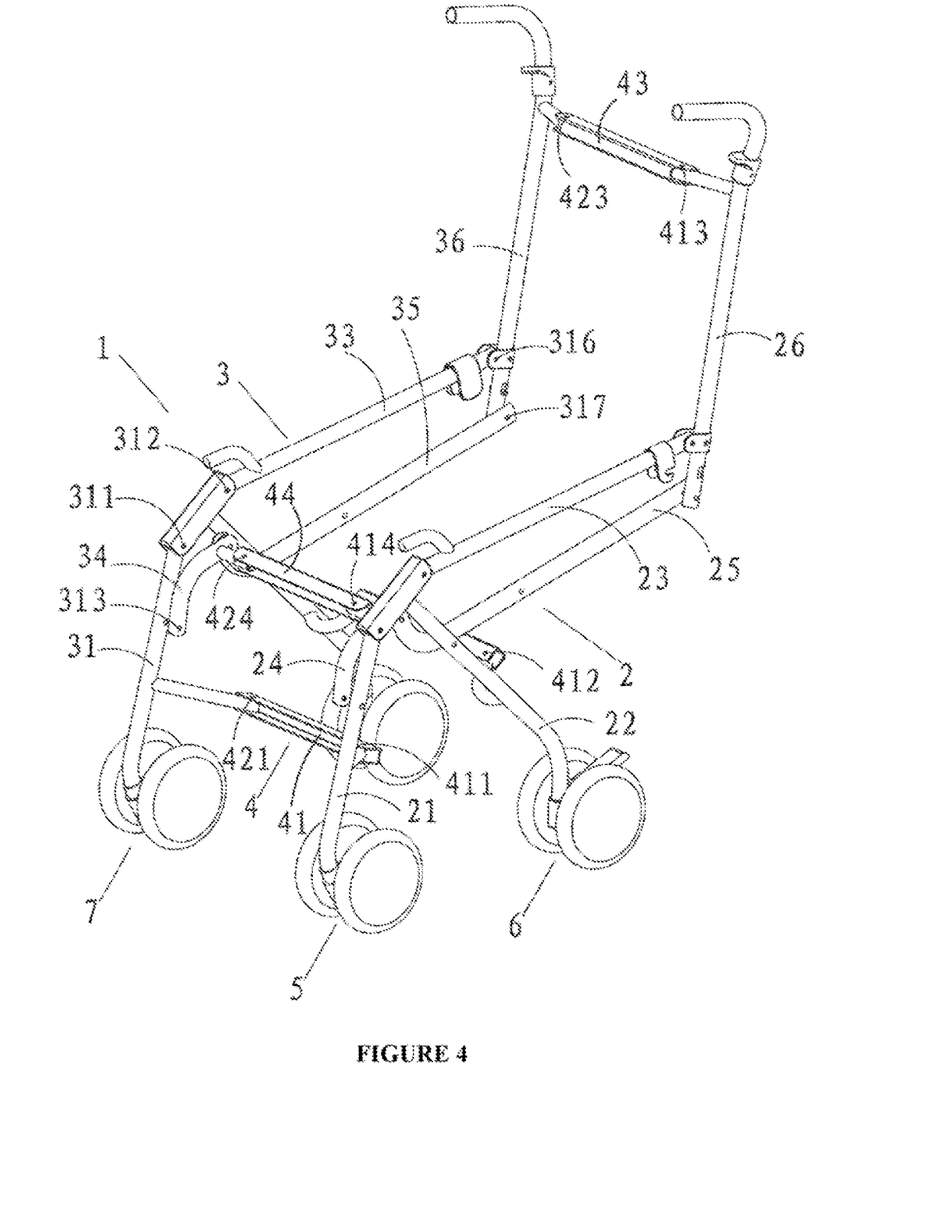
FIG. 4 is a perspective view of the frame in the course of conversion between the folded position and the unfolded position according to the invention (embodiment 1)
Figure 5:
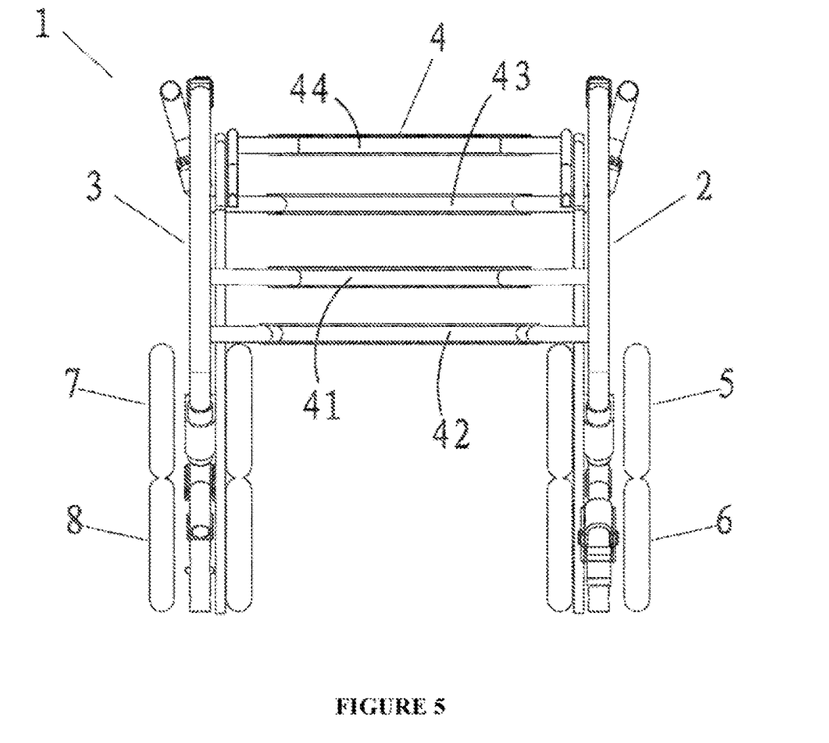
FIG. 5 is a front view of the frame in the first folded state according to the invention (embodiment 1)
Figure 6:
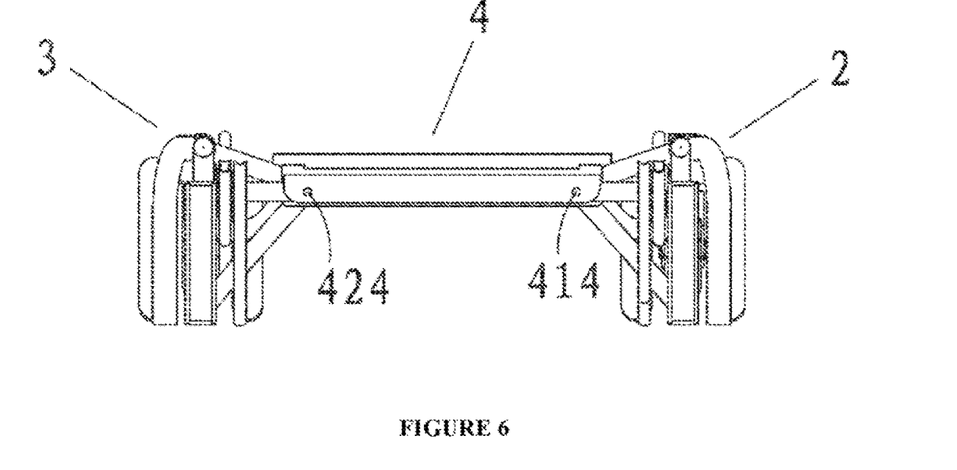
FIG. 6 is a top view of the frame in the first folded state according to the invention (embodiment 1)
Figure 7:
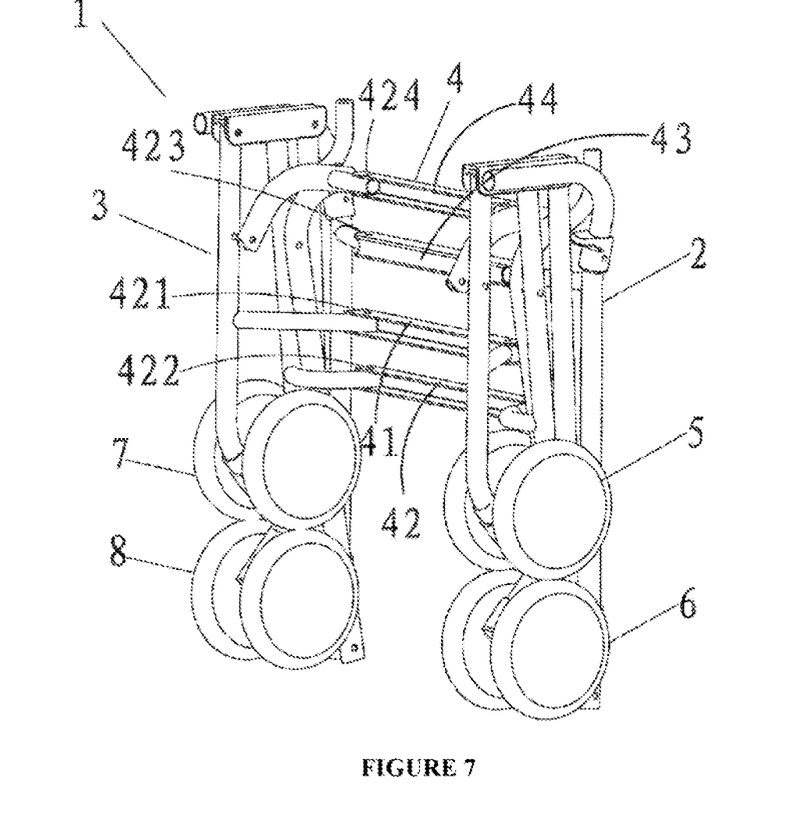
FIG. 7 is a perspective view of the frame in the first folded state according to the invention (embodiment 1)
Figure 8:
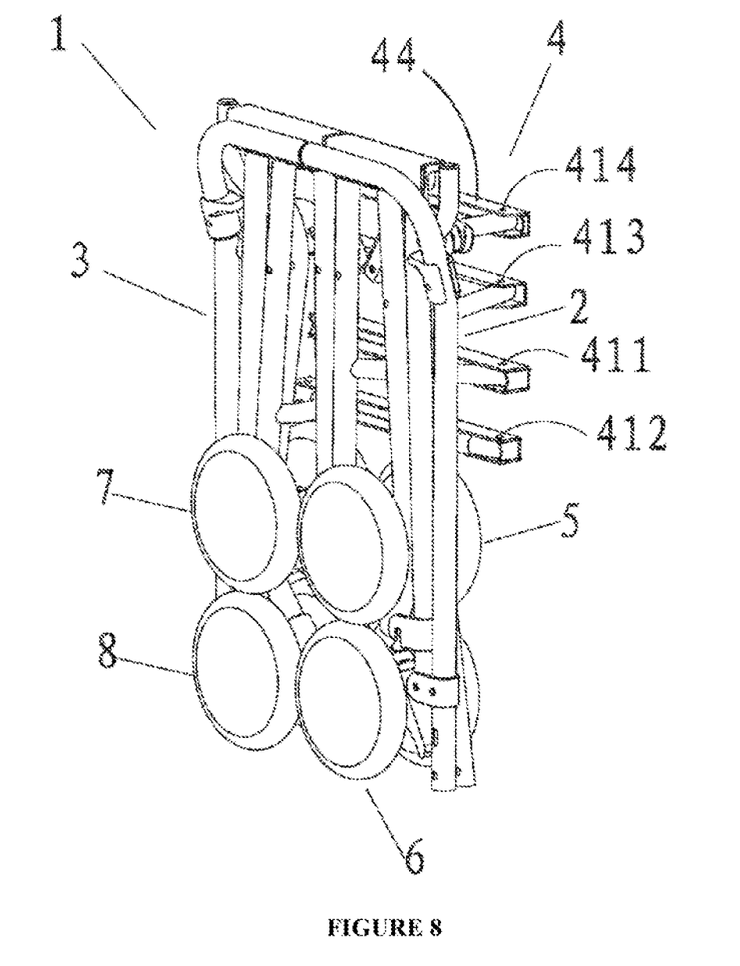
FIG. 8 a perspective view of the frame in the folded position according to the invention (embodiment 1)

Referring to the baby carriage shown in FIGS. 1-8, the frame 1 of the baby carriage mainly is consisted of the left support frame 2 and right support frame 3 respectively disposed at two sides of the frame 1 and a connecting frame 4 connected between them. In this embodiment, the left support frame 2 and the right support frame 3 substantially are configured as the same configuration.

Specifically, the baby carriage in this embodiment comprises a frame 1 having an unfolded position and a folded position, a left front wheel assembly 5, a right front wheel assembly 7, a left rear wheel assembly 6, a right rear wheel assembly 8, a frame locking mechanism for locking the frame 1 in the unfolded position and a seat disposed on the frame 1. The seat is mainly consisted of a cloth sleeve (not shown).

The frame 1 comprises a left support frame 2 at the left side thereof, a right support frame 3 at the right side thereof, and a connecting frame 4 connected between the left support frame 2 and the right support frame 3.

The left support frame 2 comprises:
a left front frame 21, on the lower portion of which the left front wheel assembly 5 is arranged, the left front wheel assembly 5 generally comprises a left front wheel joint rotatably disposed on the lower portion of the left front frame 21, and a left front wheel rotatably disposed on the left front wheel joint, the axis of rotation of the left front wheel joint extends in a vertical direction;
a left rear frame 22, on the lower portion of which the left rear wheel assembly 6 is arranged, and the left rear wheel assembly 6 comprises a left rear wheel joint fixed on the lower portion of the left rear frame, and a left rear wheel rotatably disposed on the left rear wheel joint;
a left rod 23, two of the upper portion of the left front frame 21, the upper portion of the left rear frame 22 and the lower portion of the left rod 23 are rotatably connected with each other, and the other one is rotatably connected with at least one of the two, in this embodiment, preferably, the upper portion of the left front frame 21 is rotatably connected with the upper portion of the left rear frame 22 by a left first shaft 211, the lower portion of the left rod 23 is rotatably connected with the upper portion of the left rear frame 22 by a left second shaft 212, and the left first shaft 211 is located in front of and below the left second shaft 212. When the frame 1 is folded, the left front frame 21 and the left rod 23 respectively draw close to the left rear frame 22. It is also possible that, the upper portion of the left front frame 21, the rear portion of the left rear frame 22 and the left rod 23 are rotatably and coaxially connected with each other;
a left connecting rod 24, the front portion of the left connecting rod 24 is rotatably connected with the left front frame 21 by a left third shaft 213;
a left pull rod 25, which is rotatably connected with the left rear frame 22 by a left fourth shaft 214, and which is rotatably connected with the rear portion of the left connecting rod 24 by a left fifth shaft 215, the left fifth shaft 215 can be located in front or back of the left fourth shaft 214, in this embodiment, the left fifth shaft 215 is located in front of the left fourth shaft 214; and
a left push rod frame 26, which is rotatably connected with the upper portion of the left rod 23 by a left sixth shaft 26, and the lower portion of which is rotatably connected with the upper portion of the left pull rod 25 by a left seventh shaft 27.

The right support frame 3 comprises:
a right front frame 31, on the lower portion of which the right front wheel assembly 7 is arranged;
a right rear frame 32, on the lower portion of which the right rear wheel assembly 8 is arranged;
a right rod 33, two of the upper portion of the right front frame 31, the upper portion of the right rear frame 32 and the lower portion of the right rod 33 are rotatably connected with each other, and the other one is rotatably connected with at least one of the two, in this embodiment, the upper portion of the right front frame 31 is rotatably connected with the upper portion of the right rear frame 32 by a right first shaft 311, the lower portion of the right rod 33 is rotatably connected with the upper portion of the right rear frame 32 by a right second shaft 312, and the right first shaft 311 is located in front of and below the right second shaft 312, when the frame 1 is folded, the right front frame 31 and the right rod 33 respectively draw close to the right rear frame 32, it is also possible that, the upper portion of the right front frame 31, the rear portion of the right rear frame 32 and the right rod 33 are rotatably and coaxially connected with each other.
a right connecting rod 34, the front portion of which is rotatably connected with the right front frame 31 by a right third shaft 313;
a right pull rod 35, which is rotatably connected with the right rear frame 32 by a right fourth shaft 314, and which is rotatably connected with the rear portion of the right connecting rod 34 by a right fifth shaft 315; likewise, the right fifth shaft 315 can be located in front or back of the right fourth shaft 314, in this embodiment, the right fifth shaft 315 is located in front of the right fourth shaft 314; and a right push rod frame 36, which is rotatably connected with the upper portion of the right rod 33 by a right sixth shaft 316, and the lower portion of the right push rod frame 36 is rotatably connected with the upper portion of the right pull rod 35 by a right seventh shaft 317.

The left push rod frame 26 and the right push rod frame 36 respectively are an integrated rod.

The frame locking mechanism is disposed between the left push rod frame 26 and the left rod 23, and between the right push rod frame 36 and the right rod 33. Or alternatively, The frame locking mechanism also can be disposed in other positions, such as, between the left push rod frame 26 and the left pull rod 25, and between the right push rod frame 36 and the right pull rod 35. The specific structure of the frame locking mechanism is not involved by the technical points of the invention, and thus will not be described in more detail.

In the left support frame 2, the left front frame 21, the left rear frame 22, the left connecting rod 24 and the left pull rod 25 constitute a four-rod mechanism, and the left rear frame 22, the left rod 23, the left push rod frame 26 and the left pull rod 25 also constitute a four-rod mechanism. Correspondingly, the right support frame 3 and the left support frame 2 are symmetrical to each other.

The connecting frame 4 comprises:

a front transverse rod 41, one end of the front transverse rod 41 is rotatably connected with the left front frame 21 by a left ninth shaft 411, and the other end is rotatably connected with the right front frame 31 by a right ninth shaft 421;

a rear transverse rod 42, one end of the rear transverse rod 42 is rotatably connected with the left rear frame 22 by a left tenth shaft 412, and the other end is rotatably connected with the right rear frame 32 by a right tenth shaft 422; and an upper transverse rod 43, one end of the upper transverse rod 43 is rotatably connected with the left push rod frame 26 by a left eleventh shaft 413, and the other end is rotatably connected with the right push rod frame 36 by a right eleventh shaft 423.

When the frame 1 is in the unfolded position, an angle α is formed between the left front frame 21 and the left rod 23, and the angle α is in the range of 165°-195°, preferably 170°-185°. Preferably, and an angle α' is formed between the right front frame 31 and the right rod 33, and the angle α' is in the range of 165°-195°, preferably 170°-185°. Best, the left front frame 21 and the left rod 23 tend to be in a straight line and the left support frame 2 and the right support frame 3 is symmetrical to each other, such that the frame has small volume when it is in the folded position.

When the frame 1 is in the folded position, the shaft axis of the left ninth shaft 411 and the shaft axis of the left tenth shaft 412 are parallel to the shaft axis of the left eleventh shaft 413, and the shaft axis of the right ninth shaft 421 and the shaft axis of the right tenth shaft 422 are parallel to the shaft axis of the right eleventh shaft 423. Best, when the frame is in the folded position, the shaft axis of the left ninth shaft 411 and the shaft axis of the left tenth shaft 412 coincide with the shaft axis of the left eleventh shaft 413, and the shaft axis of the right ninth shaft 421 and the shaft axis of the right tenth shaft 422 coincide with the shaft axis of the right eleventh shaft 423, in this way, when the frame 1 is in the folded position, the left support frame 2 and the right support frame 3 can draw close well relative to the connecting frame 4.

Two front limiting mechanisms respectively are arranged between the two ends of the front transverse rod 41 and the left front frame 21 and the right front frame 31. Two rear limiting mechanisms respectively are arranged between the two ends of the rear transverse rod 42 and the left rear frame 22 and the right rear frame 32. Two upper limiting mechanisms respectively are arranged between the two ends of the upper transverse rod 43 and the left push rod frame 26 and the right push rod frame 36. The previous limiting mechanisms are not involved by the technical points of the invention, and provided that when the frame 1 is in the unfolded position, taking a front limiting mechanism as an example, as long as the left front frame 12 can rotate relative to the front transverse rod 41 only in one direction, and can not rotate in another direction. For example, two projections are provided on the two ends of the front transverse rod 41, when the frame 1 is in the unfolded position, the left front frame 12 and the right front frame 22 respectively press on the two projections on the two ends of the front transverse rod 41.

In order to make the frame 1 more stable in the unfolded position, preferably, the connecting frame 4 also comprises a connecting transverse rod 44, one end of the connecting transverse rod 44 is rotatably connected with the left connecting rod 24 by a left twelfth shaft 414, and the other end is rotatably connected with the right connecting rod 34 by a right twelfth shaft 424, the shaft axis of the left ninth shaft 411, the shaft axis of the left tenth shaft 412 and the shaft axis of the left eleventh shaft 413 are parallel to or coincide with the shaft axis of the left twelfth shaft 414. Correspondingly, and the shaft axis of the right ninth shaft 421, the shaft axis of the right tenth shaft 422 and the shaft axis of the right eleventh shaft 423 are parallel to or coincide with the shaft axis of the right twelfth shaft 424.

Two connecting rod limiting mechanisms respectively are arranged between the two ends of the connecting transverse rod 44 and the left connecting rod 24 and the right connecting rod 34. The connecting rod limiting mechanisms are similar to the front limiting mechanisms as described above.

When the frame is in the folded position, the length of the baby carriage is 250 mm, the width of the baby carriage is 126 mm, and the height of the baby carriage is 430 mm. The width and length of the frame 1 after folding will be affected by the thickness of the rods of the frame 1.

During the folding of the frame 1, namely, in the course of folding of the left support frame 2 and the right support frame 3, particularly taking the left support frame 2 as an example, the left push rod frame 26 is vertically moved downwards, the left rod 23 is rotated backwards and downwards by the left second shaft 212, and the left pull rod 25 is rotated backwards and downwards by the left fourth shaft 214, and draws close to the left rear frame 22 to drive the left connecting rod 24, such that the left front frame 21 and the left rear frame 22 draw close to each other into a first folded state under the effect of the left connecting rod 24. Then, the left support frame 2 and the right support frame 3 are overturned at an angle of 90° and folded relative to the connecting frame 4 into a second folded state, namely, the frame 1 is in the folded position.

Embodiment 2

Figure 9:
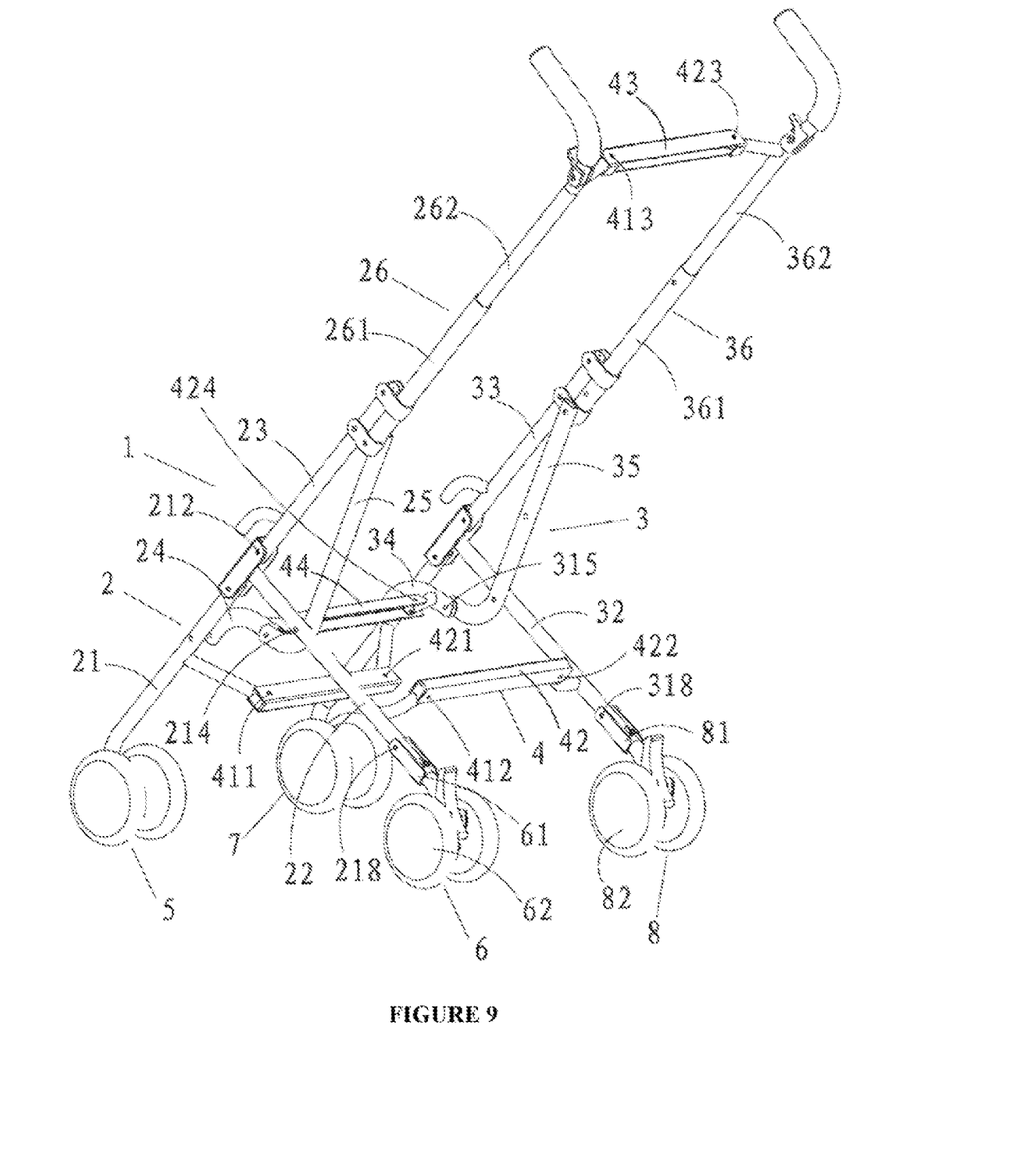
FIG. 9 is a perspective view of the frame in the unfolded position according to the invention (embodiment 2)
Figure 10:
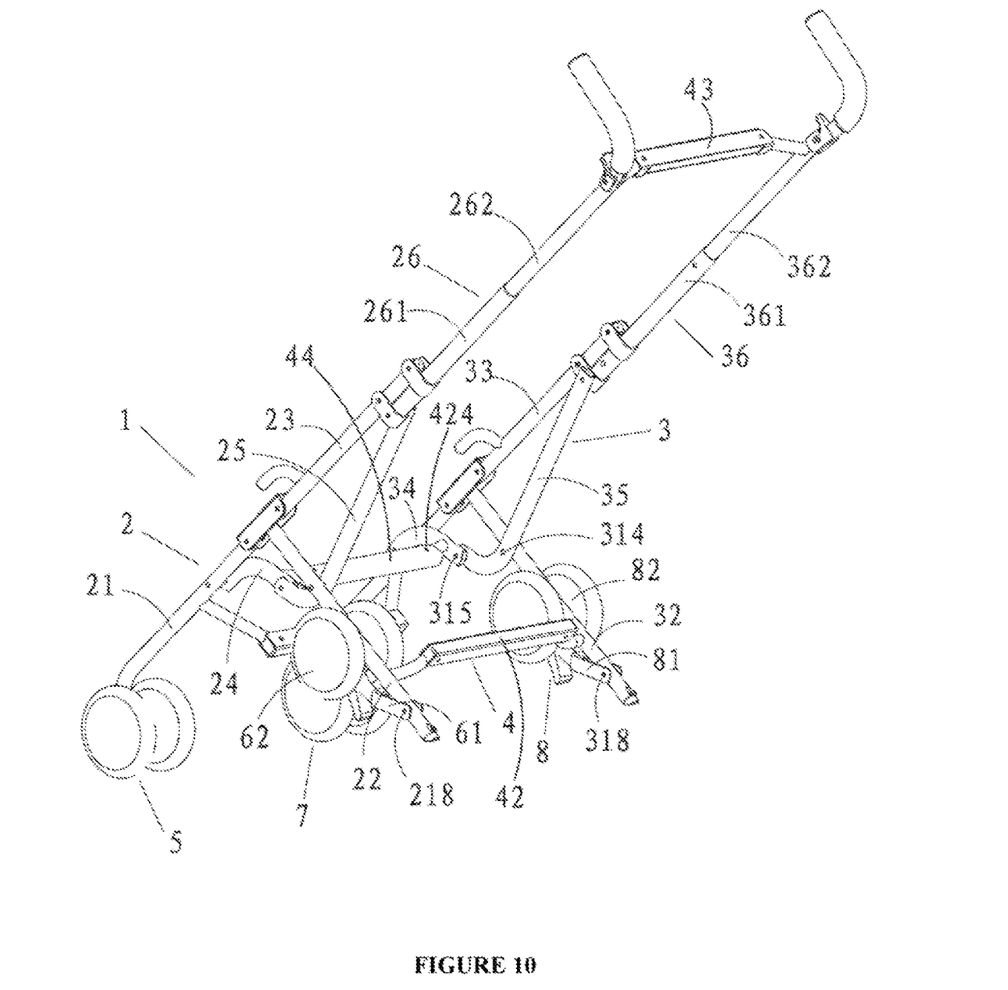
FIG. 10 is a perspective view showing the overturning of the left and right rear wheel assemblies when the frame is in the unfolded position (embodiment 2)
Figure 11:
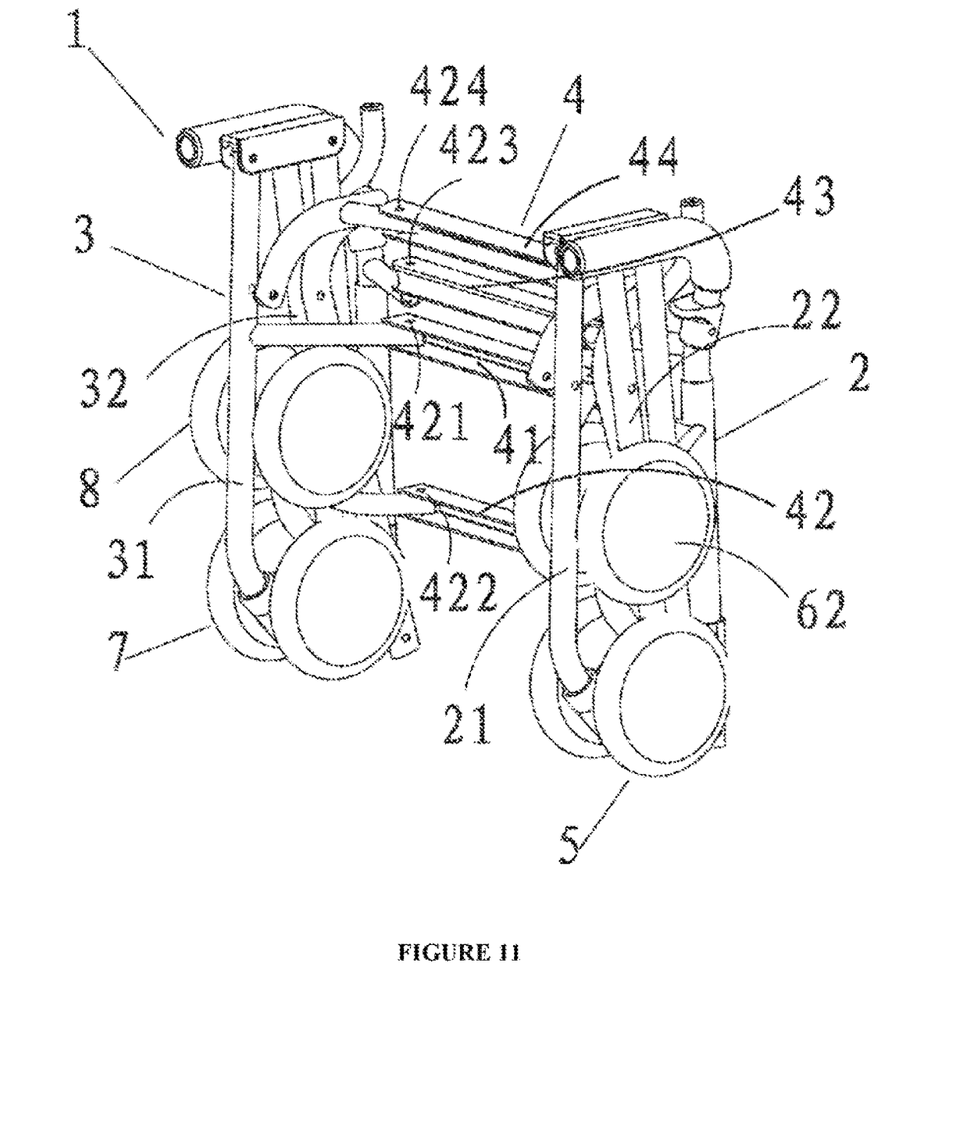
FIG. 11 is a perspective view of the frame in the first folded state according to the invention (embodiment 2)
Figure 12:
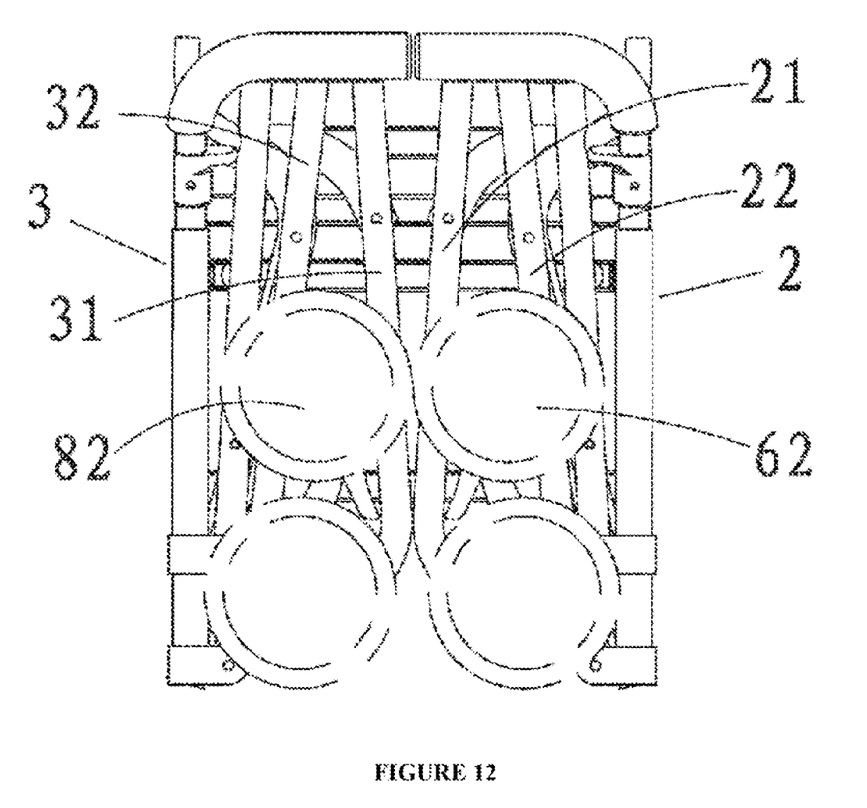
FIG. 12 is a front view of the frame in the folded position according to the invention (embodiment 2).

As shown in FIGS. 9-12, the embodiment 2 is different from the embodiment 1 in that: the left rear wheel assembly 6 comprises a left rear wheel joint 61 rotatably connected with the lower portion of the left rear frame 22 by a left eighth shaft 218, and a left rear wheel 62 rotatably arranged on the left rear wheel joint 61, and a left positioning mechanism is arranged between the left rear wheel joint 61 and the left rear frame 22. The right rear wheel assembly 8 comprises a right rear wheel joint 81 rotatably connected with the lower portion of the right rear frame 32 by a right eighth shaft 318, and a right rear wheel 82 rotatably arranged on the right rear wheel joint 81, and a right positioning mechanism is arranged between the right rear wheel joint 81 and the right rear frame 32. When the frame 1 is in the folded position, the wheel shaft of the left rear wheel 62 is located between the left front frame 21 and the left rear frame 22, and the left rear wheel 62 is located above the left front wheel, the wheel shaft of the right rear wheel 82 is located between the right front frame 31 and the right rear frame 32, and the right rear wheel 82 is located above the right front wheel. The specific structure of the left and right positioning mechanisms are not related to the technical points of the invention, and thus will not be described in more detail, and any part which can lock two rotation members with each other can be used herein.

The left push rod frame 26 is an extendable rod. The left push rod frame 26 comprises a left push rod 261 located at a lower portion thereof and rotatably connected with the left rod 23 and the left pull rod 25, and a left push handle 262 slidably disposed on the left push rod 261 along the length direction of the left push rod 261, and a left push rod positioning mechanism is arranged between the left push rod 261 and the left push handle 262. The right push rod frame 36 is also an extended rod, and the right push rod frame 36 comprises a right push rod 361 located at a lower portion thereof and rotatably connected with the right rod 33 and the right pull rod 35, and a right push handle 362 slidably disposed on the right push rod 361 along the length direction of the right push rod 361, and a right push rod positioning mechanism is arranged between the right push rod 361 and the right push handle 362. The upper transverse rod 43 is rotatably connected between the left push handle 262 and the right push handle 362. The specific structure of the left push rod positioning mechanism and the right push rod positioning mechanism are not involved by the invention, and thus will not be described in more detail, and any part which can lock two sliding parts with each other is applicable herein.

When the frame 1 is in the folded position, the left rear wheel assembly 6 and the right rear wheel assembly 8 are overturned upwards, and the left push rod frame 26 and the right push rod frame 36 shrink such that the volume of the frame 1 after folding is further reduced. When the frame is in the folded position, the length of the baby carriage is 250 mm, the width of the baby carriage is 126 mm, and the height of the baby carriage is 340 mm.

The above embodiments are described for illustrating the technical concept and features of invention, the aim is intended to enable a person skilled in the art to appreciate the content of the invention and further implement it, and the protecting scope of the invention can not be limited hereby. Also, any equivalent variations or modifications made according to the spirit of the invention should be covered within the protecting scope of the invention.

What is claimed is:

1. A baby carriage, comprising a folding frame (1), a left front wheel assembly (5), a right front wheel assembly (7), a left rear wheel assembly (6), a right rear wheel assembly (8), a frame locking mechanism for locking the frame (1) when it is in an unlocked position, and a seat disposed on the frame (1), the frame (1) comprising a left support frame (2) at the left side thereof, a right support frame (3) at the right side thereof, and a connecting frame (4) connected between the left support frame (2) and the right support frame (3), wherein the left support frame (2) comprises:
    a left front frame (21) having an upper portion and a lower portion, the left front wheel assembly (5) being arranged on the lower portion of the left front frame (21);
    a left rear frame (22) having an upper portion and a lower portion, the left rear wheel assembly (6) being arranged on the lower portion of the left rear frame (22);
    a left rod (23) having an upper portion and a lower portion, the upper portion of the left front frame (21), the upper portion of the left rear frame (22) and the lower portion of the left rod (23) being rotatably connected with each other;
    a left connecting rod (24) having a front portion and a rear portion, and the front portion of the left connecting rod (24) being rotatably connected with the left front frame (21) by a left third shaft (213);
    a left pull rod (25) having an upper portion and a lower portion, and the left pull rod (25) being rotatably connected with the left rear frame (22) by a left fourth shaft (214), and the rear portion of the left connecting rod (24) being rotatably connected with the left pull rod (25) by a left fifth shaft (215); and
    a left push rod frame (26) having an upper portion and a lower portion, the upper portion of the left rod (23) being rotatably connected with the left push rod frame (26) by a left sixth shaft (216), and the lower portion of the left push rod frame (26) being rotatably connected with the upper portion of the left pull rod (25) by a left seventh shaft (217);

the right support frame (3) comprising:
    a right front frame (31) having an upper portion and a lower portion, the right front wheel assembly (7) being arranged on the lower portion of the right front frame (31);
    a right rear frame (32) having an upper portion and a lower portion, the right rear wheel assembly (8) being arranged on the lower portion of the right rear frame (32);
    a right rod (33) having an upper portion and a lower portion, the upper portion of the right front frame (31), the upper portion of the right rear frame (32) and the lower portion of the right rod (33) being rotatably connected with each other;
    a right connecting rod (34) having a front portion and a rear portion, and the front portion of the right connecting rod (34) being rotatably connected with the right front frame (31) by a right third shaft (313);
    a right pull rod (35) having an upper portion and a lower portion, and the right pull rod (35) being rotatably connected with the right rear frame (32) by a right fourth shaft (314), and the rear portion of the right connecting rod (34) being rotatably connected with the right pull rod (35) by a right fifth shaft (315); and
    a right push rod frame (36) having an upper portion and a lower portion, the upper portion of the right rod (33) being rotatably connected with the right push rod frame (36) by a right sixth shaft (316), and the lower portion of the right push rod frame (36) being rotatably connected with the upper portion of the right pull rod (35) by a right seventh shaft (317); and the connecting frame (4) comprising:

a front transverse rod (41), one end of the front transverse rod (41) being rotatably connected with the left front frame (21) by a left ninth shaft (411), and the other end being rotatably connected with the right front frame (31) by a right ninth shaft (421);

a rear transverse rod (42), one end of the rear transverse rod (42) being rotatably connected with the left rear frame (22) by a left tenth shaft (412), and the other end being rotatably connected with the right rear frame (32) by a right tenth shaft (422); and an upper transverse rod (43), one end of the upper transverse rod (43) being rotatably connected with the left push rod frame (26) by a left eleventh shaft (413), and the other end being rotatably connected with the right push rod frame (36) by a right eleventh shaft (423);

the portions of the left front frame (21) and the left rod (23) connected with each other respectively extend along an axis, and the portions of the right front frame (31) and the right rod (33) connected with each other respectively extend along an axis, when the frame (1) is in an unfolded state, an angle α in the range of 165°-195° is formed between the axis of the left front frame (21) and the axis of the left rod (23), and an angle α' in the range of 165°-195° is formed between the axis of the right front frame (31) and the axis of the right rod (33).

2. The baby carriage as claimed in claim 1, wherein when the frame (1) is in a folded state, the shaft axis of the left ninth shaft (411) and the shaft axis of the left tenth shaft (412) are parallel to the shaft axis of the left eleventh shaft (413), and the shaft axis of the right ninth shaft (421) and the shaft axis of the right tenth shaft (422) are parallel to the shaft axis of the right eleventh shaft (423), or alternatively the shaft axis of the left ninth shaft (411) and the shaft axis of the left tenth shaft (412) are collinear with the shaft axis of the left eleventh shaft (413), and the shaft axis of the right ninth shaft (421) and the shaft axis of the right tenth shaft (422) are collinear with the shaft axis of the right eleventh shaft (423).

3. The baby carriage as claimed in claim 1, wherein a first front limiting mechanism is arranged on the corresponding ends of the left front frame (21) and/or the front transverse rod (41) for limiting the unidirectional rotation of the left front frame (21) relative to the front transverse rod (41) when the frame (1) is unfolded, and a second front limiting mechanism being arranged on the corresponding ends of right front frame (31) and/or the front transverse rod (41) for limiting the unidirectional rotation of the right front frame (31) relative to the front transverse rod (41) when the frame (1) is unfolded.

4. The baby carriage as claimed in claim 1, wherein a first rear limiting mechanism is arranged on the corresponding ends of the left rear frame (22) and/or the rear transverse rod (42) for limiting the unidirectional rotation of the left rear frame (22) relative to the rear transverse rod (42) when the frame (1) is unfolded, and a second rear limiting mechanism being arranged on the corresponding ends of right rear frame (32) and/or the rear transverse rod (42) for limiting the unidirectional rotation of the right rear frame (32) relative to the rear transverse rod (42) when the frame (1) is unfolded.

5. The baby carriage as claimed in claim 1, wherein a first upper limiting mechanism is arranged on the corresponding ends of the left push rod frame (26) and/or the upper transverse rod (43) for limiting the unidirectional rotation of the left push rod frame (26) relative to the upper transverse rod (43) when the frame (1) is unfolded, and a second upper limiting mechanism being arranged on the corresponding ends of the right push rod frame (36) and/or the upper transverse rod (43) for limiting the unidirectional rotation of the right push rod frame (36) relative to the upper transverse rod (43) when the frame (1) is unfolded.

6. The baby carriage as claimed in claim 1, wherein the connecting frame (4) also comprises a connecting transverse rod (44), one end of the connecting transverse rod (44) being rotatably connected with the left connecting rod (24) by a left twelfth shaft (414), and the other end being rotatably connected with the right connecting rod (34) by a right twelfth shaft (424), the shaft axis of the left ninth shaft (411), the shaft axis of the left tenth shaft (412) and the shaft axis of the left eleventh shaft (413) being parallel to or collinear with the shaft axis of the left twelfth shaft (414), and the shaft axis of the right ninth shaft (421), the shaft axis of the right tenth shaft (422) and the shaft axis of the right eleventh shaft (423) being parallel to or collinear with the shaft axis of the right twelfth shaft (424).

7. The baby carriage as claimed in claim 4, wherein the corresponding ends of the left connecting rod (24), the right connecting rod (34) and/or the connecting transverse rod (44) respectively are provided with a connecting rod limiting mechanism.

8. The baby carriage as claimed in claim 1, wherein the left front wheel assembly (5) comprises a left front wheel, the left rear wheel assembly (6) comprising:

a left rear wheel joint (61) rotatably connected with the lower portion of the left rear frame (22) by a left eighth shaft (218), a left positioning mechanism being arranged on the left rear wheel joint (61) and/or the left rear frame (22) for positioning them when they are unfolded relative to each other; and a left rear wheel (62) rotatably arranged on the left rear wheel joint (61);

the right front wheel assembly (7) comprising a right front wheel, the right rear wheel assembly (8) comprising:

a right rear wheel joint (81) rotatably connected with the lower portion of the right rear frame (32) by a right eighth shaft (318), a right positioning mechanism being arranged on the right rear wheel joint (81) and/or the right rear frame (32) for positioning them when they are unfolded relative to each other; and a right rear wheel (82) rotatably arranged on the right rear wheel joint (81);

when the frame (1) is in the folded state, the wheel shaft of the left rear wheel (62) is located between the left front frame (21) and the left rear frame (22), and the left rear wheel (62) is located above the left front wheel, the wheel shaft of the right rear wheel (82) is located between the right front frame (31) and the right rear frame (32), and the right rear wheel (82) is located above the right front wheel.

9. The baby carriage as claimed in claim 1, wherein the left push rod frame (26) comprises:

a left push rod (261) located at a lower portion thereof and rotatably connected with the left rod (23) and the left pull rod (25); and a left push handle (262) slidably disposed on the left push rod (261) along the length direction of the left push rod (261, and a left push rod positioning mechanism being arranged on the left push rod (261) and/or the left push handle (262);

the right push rod frame (36) comprising:

a right push rod (361) located at a lower portion thereof and rotatably connected with the right rod (33) and the right pull rod (35); and a right push handle (362) slidably disposed on the right push rod (361) along the length direction of the right push rod (361), and a right push rod positioning mechanism being arranged on the right push rod (361) and/or the right push handle (362);

the upper transverse rod (43) being rotatably connected between the left push handle (262) and the right push handle (362).

10. The baby carriage as claimed in claim 1, wherein the upper portion of the left front frame (21) is rotatably connected with the upper portion of the left rear frame (22) by a left first shaft (211), the lower portion of the left rod (23) being rotatably connected with the upper portion of the left rear frame (22) by a left second shaft (212), the left first shaft (211) being located below and in front of the left second shaft (212), the upper portion of the right front frame (31) being rotatably connected with the upper portion of the right rear frame (32) by a right first shaft (311), the lower portion of the right rod (33) being rotatably connected with the upper portion of the right rear frame (32) by a right second shaft (312), the right first shaft (311) being located below and in front of the right second shaft (312).

11. The baby carriage as claimed in claim 1, wherein when the frame (1) is in the folded position, the length of the baby carriage is within the range of 250-290 mm, the width of the baby carriage is within the range of 120-150 mm and the height of the baby carriage is within the range of 340-500 mm.

12. The baby carriage as claimed in claim 1, wherein the left fifth shaft (215) is located in front of the left fourth shaft (214), and the right fifth shaft (315) is located in front of the right fourth shaft (314).

13. The baby carriage as claimed in claim 1, wherein the left seventh shaft (217) is located below the left sixth shaft (216), and the right seventh shaft (317) is located below the right sixth shaft (316).

14. The baby carriage as claimed in claim 1, wherein the angle α is in the range of 170°-185°, and correspondingly the angle α' is in the range of 170°-185°.

* * * * *